Aug. 17, 1965  O. GARAPOLO  3,200,865

BACON SLICING MACHINE

Filed April 12, 1963  2 Sheets-Sheet 1

Inventor,
Orlando Garapolo,
By: Schneider, Dressler, Goldsmith & Clement, Attys.

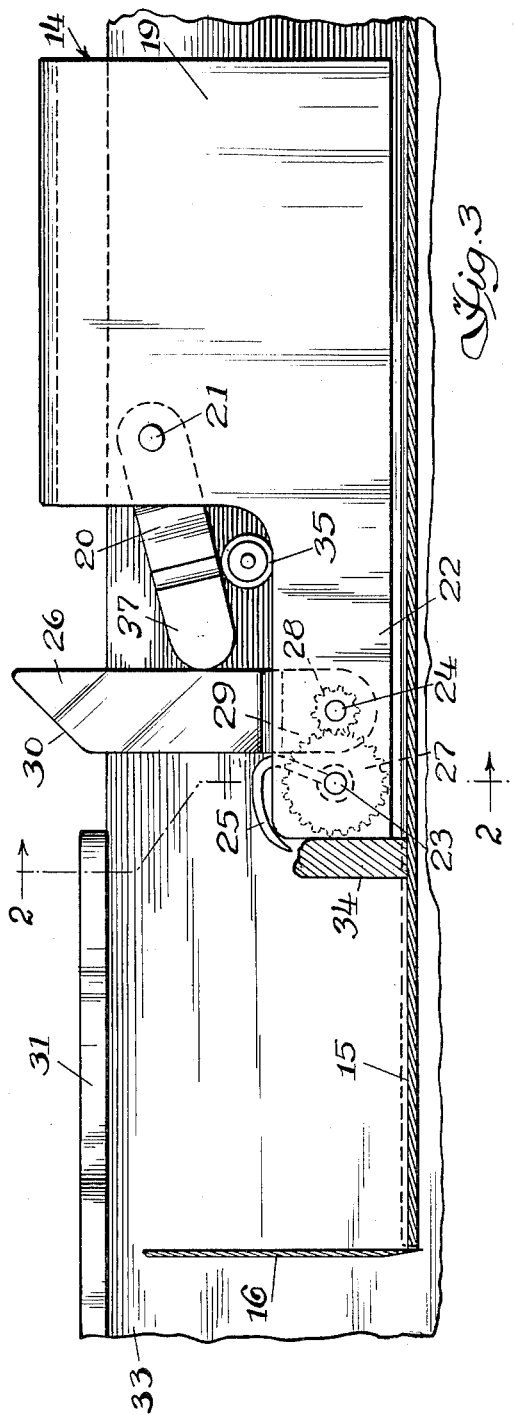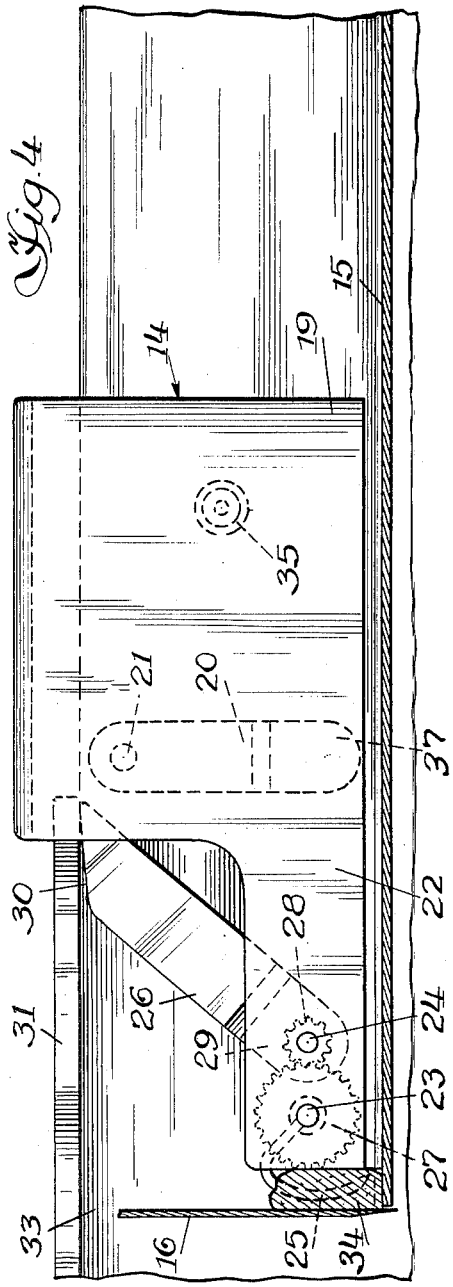

United States Patent Office 3,200,865
Patented Aug. 17, 1965

3,200,865
BACON SLICING MACHINE
Orlando Garapolo, Brookfield, Ill., assignor to Wilson & Co., Inc., a corporation of Delaware
Filed Apr. 12, 1963, Ser. No. 272,570
4 Claims. (Cl. 146—95)

This invention relates to a slicing machine, more particularly it is concerned with bacon slicing machines and with means for automatically retracting the tines of the gripping mechanism which hold meat during a slicing operation, as the carriage bearing the pinned heel returns to the station where a new portion of meat or slab of bacon will be positioned on the carriage.

During slicing operations, a, for example, slab of bacon must be gripped firmly as it is pushed into engagement with the slicing blade of a bacon slicing machine in order to obtain accurate, uniform slicing. The slab of bacon is held in place during the slicing operation by a plurality of gripper tines that extend into one end of the slab. After each slab of bacon is substantially completely sliced, the carriage that pushes the slab of bacon into engagement with the slicing blade is returned to its starting position and carriers with it the heel of the slab into which the gripper tines extend. In order to obtain maximum output, the machine is operated automatically, and the interval of time allowed for removal of the heel and positioning of a new slab of bacon for the next slicing operation must be kept at a minimum.

In order to reduce the non-slicing time of the machine, means have been devised to move the gripper tines into engagement with a slab of bacon automatically within a very short time interval as the slab of bacon, positioned on the bed of the machine in front of the carriage, is moved toward the slicing blade. One such means comprises a shaft rotatably mounted in plates extending forwardly of the carriage. The gripper tines are secured to the shaft and project upwardly and forwardly from the shaft. A gear fixed to the shaft meshes with a second gear fixed to a parallel shaft also rotatably mounted in said plates. A cam arm fixed to the second shaft is positioned to extend vertically upwardly therefrom when the gripper tines are free of a slab of bacon positioned immediately in front of the carriage. A cam plate is mounted on the machine in position to be engaged by the cam arm before the slab of bacon engages the slicing blade. The cam plate forces the cam arm to move clockwise, and the intermeshed gears move the gripping tines counterclockwise into gripping engagement with the slab of bacon.

Manual disengagement of the gripper tines and removal of the heel of the slab of bacon have proved to be too slow for successful commercial slicing operations. Various means have been tried for disengaging the gripper tines from the heel of the slab automatically but heretofore no means have been found capable of accomplishing this result within the desired time interval.

Often when the tines were found jammed into the heel of bacon and the operators could not get it free before the carriage started its movement toward the slicing blade, the operators of the slicing machine placed the new slab of bacon against the heel of the slab previously sliced rather than in a position permitting the tines to secure the slab. This practice caused wastage, poor cutting, and general operating problems.

In accordance with the present invention, a release lever is pivoted adjacent its upper end to one wall of the carriage, and an abutment is secured to the slicing machine in position to be engaged by said release lever as the carriage is returned to its starting position. The release lever rides over the abutment as the carriage is moved toward the slicing blade, and the release lever drops into vertical position before the slab of bacon is completely sliced. On the return movement of the carriage, the release lever again rides over the abutment. However, before the lower end of the release lever clears the abutment on the return movement, it engages the rear edge of the cam arm which is rearwardly inclined because of the interengagement of the gripper tines with the heel of the slab of bacon that has just been sliced. The lower end of the release lever is moved pivotally upward by the abutment while it is engaged with the rear edge of the cam arm, and the release lever exerts a positive force against the cam arm to move it into vertically upright position, thus disengaging the gripper tines from the heel of the slab of bacon.

A structure by means of which the above and other advantages of the invention are attained will be described in detail in the following specification, taken in conjunction with the accompanying drawings showing a preferred illustrative embodiment of the invention, in which.

FIG. 3 is a longitudinal sectional view showing the gripper tines and the release lever in position as the carriage is moved to its starting position, just after the lever kicks the cam arm to release the gripper tines from the heel of a slab of bacon; and FIG. 4 is a longitudinal sectional view showing the cam arm and the gripper tines in the positions occupied at the end of the movement of the carriage toward the slicing blade, just before the start of the return movement of the carriage.

Figure 1:
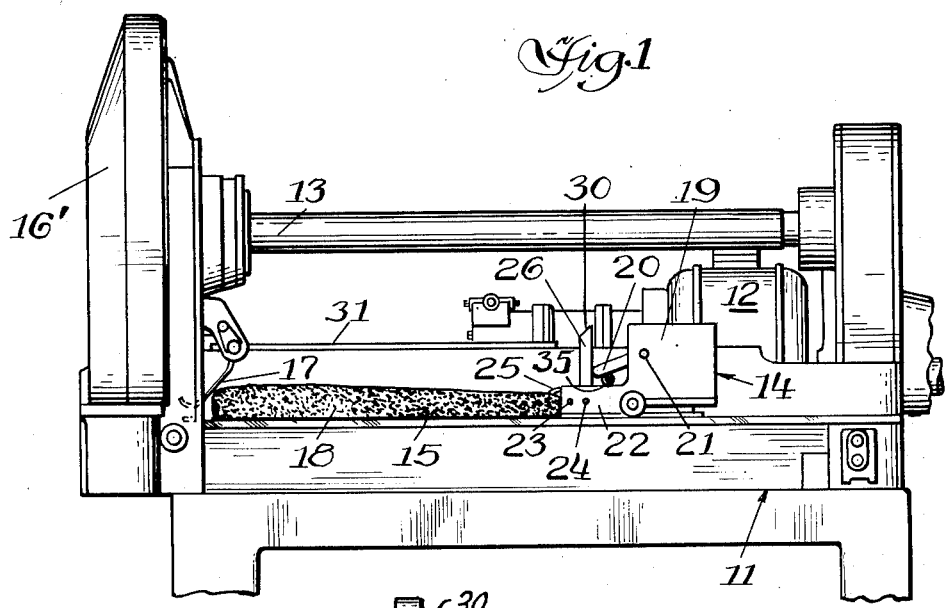
FIG. 1 is a front elevational view of a bacon slicing machine in which the present invention is embodied.
Figure 2:
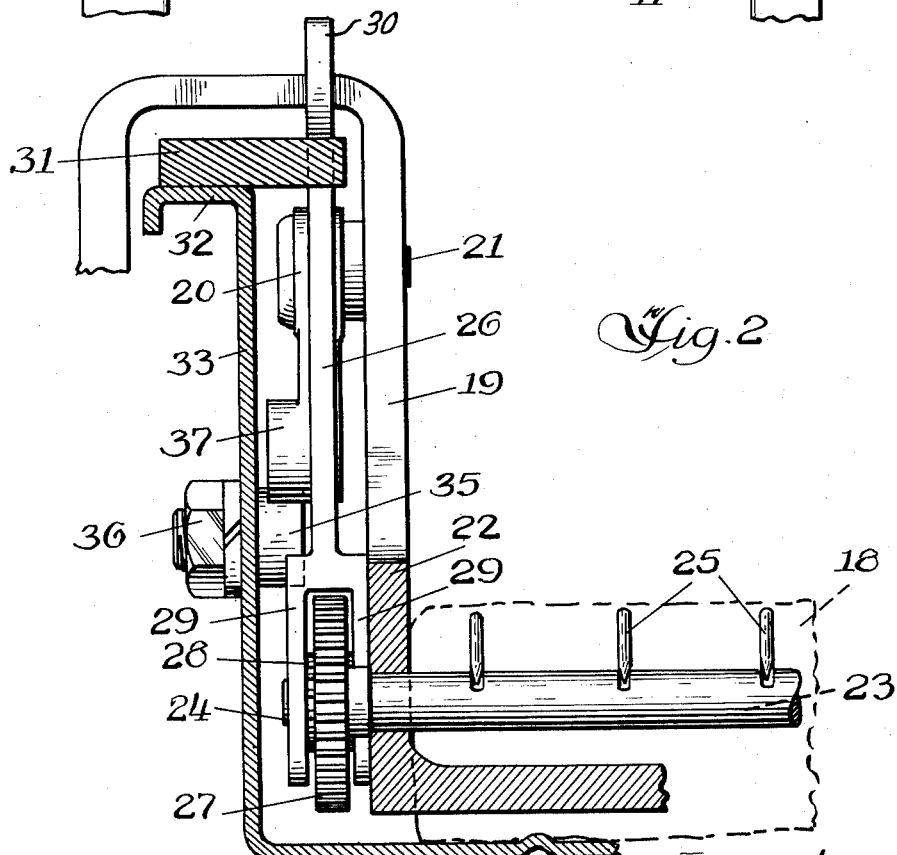
FIG. 2 is a fragmentary cross sectional view, taken generally along the line 2—2 of FIG. 3, showing the gripper tines and the release mechanism.

Referring to FIG. 1 of the drawings, a bacon slicing machine comprises a frame 11 having a motor 12 for rotating a shaft 13 and reciprocating a carriage 14 across the bed 15 of the machine. A slicing blade 16, mounted on one end of the shaft is enclosed in a housing 16'. The shaft is rotated continuously at a high rate of speed. The forward and rearward movement of the carriage is controlled by a pneumatic system and a plurality of valves. A plurality of sensing fingers 17 mounted in close proximity to the slicing blade measures the cross sectional area of the slab 18 of bacon being sliced and actuates the valves to vary the thickness of the bacon slices according to their cross sectional area, so that each group of a predetermined number of slices will have uniform weight. This structure is fully described in my prior Patent No. 2,966,186, issued December 27, 1960, and, since it is not part of the present invention, the description is not repeated here.

The carriage 14 has an upstanding wall 19 to which a release lever 20 is pivoted, as indicated at 21. The wall 19 has a pair of parallel plates 22 extending forwardly therefrom. Plates 22 may be integral with wall 19 or may be separate members secured thereto in any suitable manner. Two parallel shafts 23 and 24 are rotatably mounted in plates 22. A plurality of gripper tines 25 are each secured at one end to shaft 23 and their free ends extend upwardly and forwardly from said shaft to engage a slab 18 of bacon to be sliced. A cam arm 26 is fixed to shaft 24. Intermeshing gears 27 and 28 are mounted on shafts 23 and 24, respectively. The lower end of cam arm 26 is bifurcated, as indicated at 29, to straddle gear 27. The upper end of arm 26 has an inclined cam surface 30 adapted to engage a cam plate 31 when carriage 14 is moved forwardly toward the slicing blade.

The cam plate 31 is mounted on a flange 32 extending laterally from the upper edge of an upstanding plate 33 that is integral with frame 11. As shown in FIG. 3, one end of cam plate 31 is positioned close to the forward edge of cam arm 26 so that it is engaged by the cam arm shortly after carriage 14 starts its forward movement. The lower end of cam surface 30 is closer to the cam plate than its upper end. When the carriage 14 starts moving forwardly, cam arm 26 engages the end of cam plate 31 before the slab 18 of bacon is engaged by the slicing blade. As the carriage 14 continues its forward movement, cam arm 26 is rotated clockwise and rotates shaft 24 and gear 28 with it until cam surface 30 rides under the cam plate.

The clockwise rotation of gear 28 rotates gear 27 and shaft 23 counterclockwise to drive gripping tines 25 into the slab 18 of bacon. The gripper tines hold slab 18 firmly in place until it is almost completely sliced, and only the heel 34, into which tines 25 project, remains. The cam plate is longer than the path of travel of the cam arm and holds the cam arm in the inclined position shown in FIG. 4 until the slab of bacon has been sliced as far as possible, and the carriage is moved back toward its starting position. The engagement of tines 25 with the bacon holds the cam arm in said inclined position after the cam arm clears the end of cam plate 31 on the return movement of the carriage, until a positive force is exerted against the cam arm.

An abutment, in the form of a stud 35, is secured to plate 33 by a nut 36. The lower end of release lever 20 has a lateral projection 37 adapted to cooperate with stud 35 and cam rod 26 to remove the gripper tines from the heel of the slab of bacon after the slab has been sliced. When the carriage moves forward to push the slab of bacon into engagement with the slicing blade, release lever 20 rides over the abutment. As shown in FIG. 4, the spacing of abutment 35 and release lever 20 permits the lower end of the lever to clear the abutment so that the release lever drops into vertical position between the slicing blade and the abutment before the slab of bacon is completely sliced.

During the return movement of the carriage, after the bacon has been sliced, release lever 20 engages abutment 35 and is pivotally moved in a clockwise direction thereby. Cam arm 26, which is also moved to the right, as viewed in FIG. 4, by the return movement of the carriage, is so positioned, relative to pivot 21, that the lower end of the release lever engages the edge of cam arm 26 before the release lever clears the abutment. The upward pivotal movement of release lever 20 causes its lower end to exert a positive force against the cam arm 26 to move it into vertically upright position, thereby releasing the gripper tines from the heel of the slab of bacon that has just been sliced. The gripper tines are released from the bacon just before the carriage reaches the end of its return movement thus allowing a short time interval for the operator to remove the heel 34 and to position a new slab 18 of bacon before the carriage starts moving toward the slicing blade.

Although I have described a preferred embodiment of the invention in considerable detail, it will be understood that the description thereof is intended to be illustrative, rather than restrictive, as many details of construction may be modified or changed without departing from the spirit or scope of the invention. Accordingly, I do not desire to be restricted to the exact structure disclosed.

I claim:

1. In a meat slicing machine, a slicing blade, a carriage for moving a portion of meat to said slicing blade, means for reciprocating said carriage longitudinally of the machine, a plurality of gripper tines engageable with the heel of a portion of meat being moved by said carriage, a cam arm operatively connected to said gripper tines, means engageable with said cam arm during the movement of said meat toward said slicing blade to force said gripper tines into holding engagement with said meat, and means operable automatically to disengage said gripper tines from the heel of said portion of meat at a predetermined point in the return travel of said carriage, said last mentioned means comprising a lever pivotally mounted on the carriage and directly engageable with said cam arm during the return movement of said carriage to move said cam arm a distance sufficient to force said gripper tines out of holding engagement with the heel of said portion of meat before completion of the return movement of the carriage.

2. In a bacon slicing machine, a slicing blade, a carriage for moving a slab of bacon into engagement with said slicing blade, means for reciprocating said carriage longitudinally of the machine, a plurality of gripper tines engageable with a slab of bacon being moved by said carriage to hold it against displacement relative to said carriage during the slicing operation, an arm pivotally mounted on said carriage, said arm being operatively connected to said tines to move them into and out of engagement with said slab of bacon as the arm is pivotally moved in opposite directions, means engageable with said arm to move said arm pivotally in one direction as said carriage is moved toward said slicing blade, thereby forcing said tines into engagement with said slab of bacon, a release lever directly engageable wtih said arm to move it pivotally in the opposite direction to disengage said tines from the heel of the slab of bacon, and means engageable with said release lever to move it into engagement with said arm during the return movement of said carriage.

3. A bacon slicing machine comprising a frame, a slicing blade mounted on said frame, a carriage mounted on said frame for reciprocatory movement toward and away from said blade, means for continuously reciprocating said carriage, a plurality of gripper tines mounted on said carriage, said tines being engageable with a slab of bacon adjacent the forward end of said carriage for holding said slab of bacon against displacement relative to said carriage, whereby said slab of bacon is moved into engagement with said slicing blade as said carriage is moved forwardly, an arm mounted on said carriage, means operatively connecting said arm to said gripper tines, means engageable with said arm upon forward movement of said carriage to move said arm in a direction to force said gripper tines into engagement with said slab of bacon, a release lever pivotally mounted on said carriage, and means engageable with said release lever upon return movement of said carriage to move it directly against said arm to disengage said gripper tines from the heel of the slab of bacon.

4. A bacon slicing macihne comprising a frame, a slicing blade mounted on said frame, a carriage mounted on said frame for reciprocatory movement toward and away from said blade, means for continuously reciprocating said carriage, a plurality of gripper tines mounted on said carriage, said tines being engageable with a slab of bacon adjacent the forward end of said carriage for holding said slab of bacon against displacement relative to said carriage, whereby said slab of bacon is moved into engagement with said slicing blade as said carriage is moved forwardly, an arm mounted on said carriage, means operatively connecting said arm to said gripper tines, means engageable with said arm upon forward movement of said carriage to move said arm in a direction to force said gripper tines into engagement with said slab of bacon, a release lever pivotally mounted on said carriage rearwardly of said arm, and an abutment projecting from said frame to engage said release lever upon return movement of said carriage, said abutment moving said release lever into direct engagement with said arm upon return movement of said carriage, said lever moving said arm in a direction to disengage said gripper tines from the heel of said slab of bacon.

References Cited by the Examiner
UNITED STATES PATENTS 2,832,388    4/58   Folk _____ 146—95
3,010,499   11/61   Dahms et al. _____ 146—95 X J. SPENCER OVERHOLSER, *Primary Examiner.*